Nov. 11, 1952    C. H. COLVIN    2,617,912
POTENTIOMETER

Filed May 10, 1952    2 SHEETS—SHEET 1

INVENTOR.
Charles H. Colvin
BY
Howard G. Russell
his ATTORNEY

Nov. 11, 1952     C. H. COLVIN     2,617,912
POTENTIOMETER

Filed May 10, 1952                          2 SHEETS—SHEET 2

INVENTOR.
Charles H. Colvin
BY
Howard G. Russell
his ATTORNEY

Patented Nov. 11, 1952

2,617,912

UNITED STATES PATENT OFFICE 2,617,912

POTENTIOMETER

Charles H. Colvin, Morris Township, Morris County, N. J.

Application May 10, 1952, Serial No. 287,206

5 Claims. (Cl. 201—62)

This invention relates to improvements in electric potentiometers and has particular application to potentiometers of the type used for coverting physical conditions or values such as pressure, elongation, temperature and others, into electrical values for convenient transmittal to and indication by conventional indicators operating on the voltage principle.

Potentiometers of the aforementioned type are also called "transducers," and are generally of small dimensions.

The present invention is concerned with certain improvements which permit calibration of the potentiometer or transducer in a more convenient manner than it has heretofore been possible, as far as I am aware.

In calibrating a transducer, two basic adjustments must be made.

Firstly, the transducer must be adjusted for range, that is to say, its resistor is so adjusted that for the full stroke, movement, or displacement of its actuating element the pointer of the indicator sweeps the dial from one end to another. Transducers are manufactured as units for combination with any one of a number of actuators, all of which may have strokes, or movement ranges of different magnitude. It is therefore necessary to adjust the transducer in such a way that the travel of the contact shoe relatively to the resistor is matched to the stroke of the actuator. This adjustment, as will later be described in greater detail, involves an angular adjustment of the resistor with regard to the contact shoe.

The second basic adjustment required in the transducer is the adjustment for proper zero position. This involves adjustment of the resistor in such a way that for the zero position of the actuator, the voltage at the contact shoe is either zero or a predetermined small value. This adjustment generally involves movement of the resistor in a direction towards, or away from, the actuator.

Range adjustment and zero adjustment have, of course, been provided in conventional potentiometers. However, as far as I am aware, the conventional devices were so constructed that a change in the range adjustment would automatically disturb the zero adjustment of the device. In a similar manner an adjustment of the zero point would automaticaly disturb the range adjustment.

As a result, conventional forms of potentiometers and transducers were difficult to calibrate, and considerable experience or skill is required in making the necessary adjustments. The matter becomes even more complicated where the dimensions of the transducer are small. Modern light-weight transducers requiring a minimum of energy for operation are quite small and generally fit into a space of less than a cubic inch, including the resistor and all its mountings and elements for adjustment and calibration.

The present invention provides an improved transducer or potentiometer assembly which is so constructed that changes in the range adjustment will not disturb the zero adjustment, and further, that changes in the zero adjustment will not disturb the range adjustment. Also, the construction has been so simplified that only two screws, or nuts, need be loosened and tightened for all the adjustments required. The advantages of such a construction are evident. Little time is required for the complete calibration, and the calibration does not call for any particular skill or previous experience because of the aforementioned feature of complete disassociation of one adjustment from the other.

These and further objects, features and advantages of this invention will appear more fully from the detailed description which follows, accompanied by drawings, showing for the purpose of illustration, a preferred embodiment of the invention. The invention also consists in certain new and original features of construction and combination of elements hereinafter set forth and claimed.

Although the characteristic features of this invention which are believed to be novel will be particularly pointed out in the claims appended hereto, the invention itself, its objects and advantages, and the manner in which it may be carried out may be better understood by referring to the following description taken in connection with the accompanying drawings, forming a part of it in which:

Figure 1:
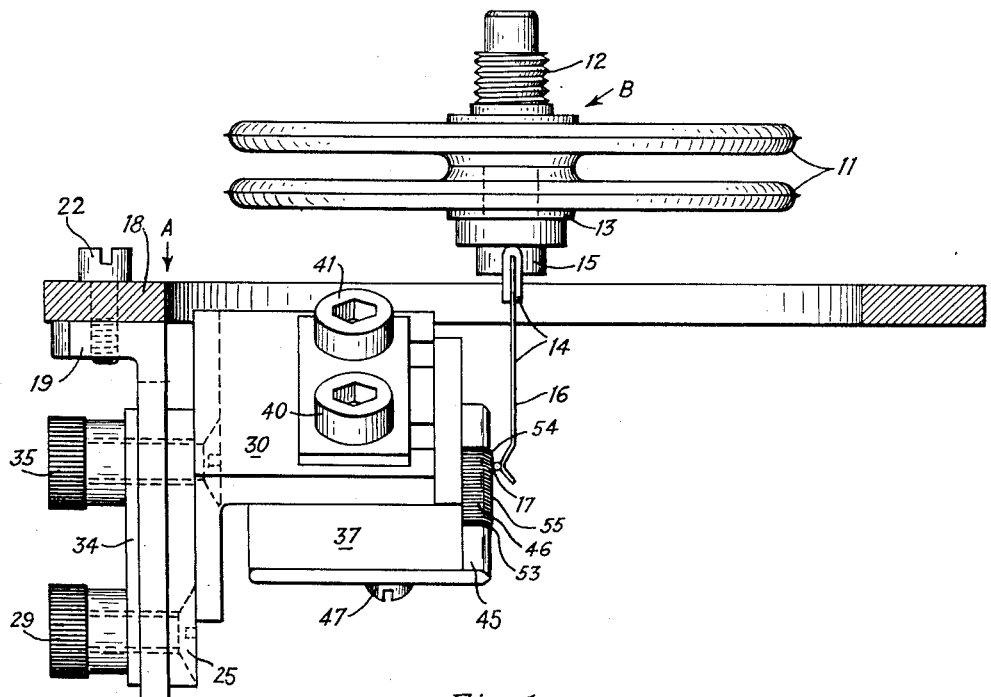
Fig. 1 is an elevational side view of a transducer embodying the invention, together with an actuator in the form of diaphragm capsules.
Figures 2, 3:
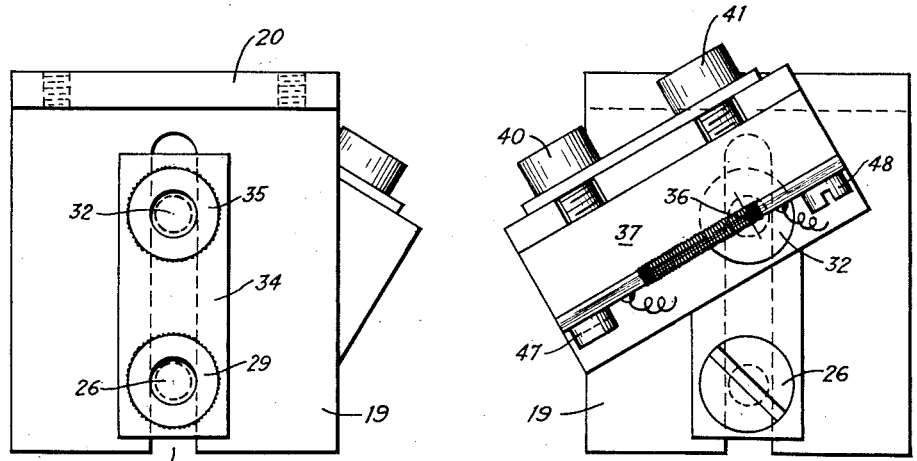
Fig. 2 is an elevational rear view of the transducer shown in Fig. 1.
Fig. 3 is an elevational front view of the transducer.

In the following description and in the claims various details will be identified by specific names for convenience. The names, however, are intended to be as generic in their application as the art will permit. Corresponding reference characters refer to corresponding parts in the several figures of the drawings.

In the drawings accompanying, and forming part of, this specification, certain specific disclosure of the invention is made for the purpose of explanation, but it is understood that the details may be modified in various respects without departure from the principles of the invention and that the invention may be applied to other structures than the one shown.

Fig. 1 illustrates a transducer assembly A and an actuator assembly B. For the purpose of illustration the actuator is shown as being a stack of diaphragm capsules 11. The diaphragm capsules have a threaded nipple 12 for connection to the point where pressure is to be measured and the center post 13 of the endmost capsule carries a contact shoe 14.

The contact shoe consists of a threaded post 15 and a relatively wide wiper blade 16 having a substantially linear contact edge 17.

The illustrated transducer assembly is mounted on a mounting ring 18. The assembly proper comprises a standard 19 having a mounting flange 20 with screw holes 21 for mounting on the ring 18 by machine screws 22.

The standard has a lengthwise slot 23 therein. This slot defines a track in the direction of which a slider is movable for adjustment in any desired position along the track.

The slider suitably comprises a pair of plates 24, 25 held together by bolts or screws extending through the slot 23. One bolt or screw 26 suitably has a flat head fitting into a counter-sunk hole 27 in the plate 25. Preferably the head of the screw 26 is soldered into the hole 27 to prevent the screw from turning.

The plate 24 on the opposite side of the standard has a hole 28 through which the screw 26 extends. A knurled nut 29 serves for convenient tightening of the slider to arrest the slides in any desired position along the track.

A bracket 30 is rotatably mounted on the slider. The bracket 30 is conveniently made from angle stock, and has a hole 31 through which a further bolt or screw 32 extends. The head of this screw also is preferably soldered into the counter-sunk hole 31 to prevent turning. In the assembled device the screw or bolt 32 extends through a hole 33 in the plate 25, through the slot 23, and through a hole 34 in the plate 28. A knurled nut 35 serves for tightening the assembly. Tightening of the nut 35 arrests the bracket in any desired position of rotative adjustment about the axis 36 defined by the screw 32.

A block 37 of insulating material is adjustably mounted on the bracket 30 for movement towards, and away from the standard 19. For this purpose the bracket has two slots 38, 39 through which screws 40 and 41 extend. The screws preferably pass through a plate or double-washer 42, into tapped holes 43, 44 in the block 37. Loosening of the screws 40 and 41 permits adjustment of the block 37 in the direction of the slots 38 and 39.

The block 37 carries a resistor shown in the illustrated form as being a strip 45 of insulating material carrying a resistor winding 46. Screws 47 and 48 extending through holes 49, 50 in the strip 45 are screwed into tapped holes 51 and 52 in the block 37.

The resistor 46 preferably has several turns of its winding shorted at each end as indicated at 53 and 54.

Figures 4, 5:
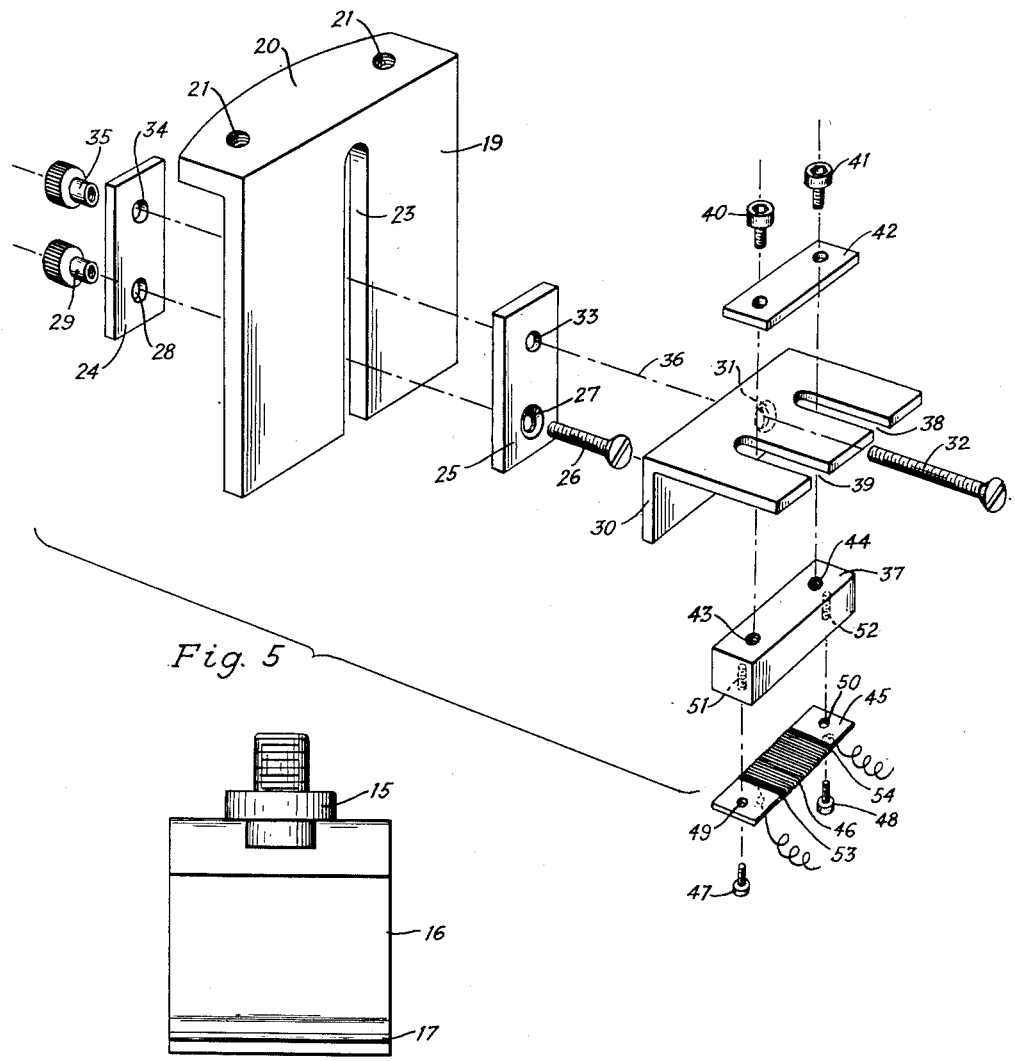
Fig. 4 is an elevational front view of the contact shoe.
Fig. 5 is an exploded perspective view of the elements of the transducer.

Referring to the elevational views 1 and 3, it is seen that the parts shown in the Figure 5 are so assembled that the resistor 46 extends far enough beyond the bracket 30 to rest against the edge 17 of the contact shoe 14 with the required amount of pressure. The pressure can easily be adjusted by means of the adjustment screws 40 and 41.

It is further apparent that the thickness of the block 37, together with the other dimensions of the device is so selected that the contact edge 55 of the resistor passes through the axis 37 of the adjustment screw 32. Putting it differently, the contact edge 55 intersects the imaginary plane defined by the slot 23 and the axis 36 at the axis 36. This arrangement permits a range adjustment of the instrument to be made without disturbing the zero position.

The adjustment of the device, or its calibration, may be carried out as follows:

Firstly, the device may be adjusted for its correct zero position. For this purpose the nut 29 is loosened entirely and the nut 35 is loosened sufficiently to permit adjustment of the slider with its bracket 30 along the track 23. This is conveniently done by tapping the plate 25 with a screw driver until the end of the resistor winding 46 is in contact with the edge 17 of the contact shoe. The nut 29 is then tightened, preventing further longitudinal movement of the slider along the standard.

The device may then be adjusted for range. Assuming that the length of the winding 46 is ¼ of an inch, whereas the total stroke of the contact shoe under the action of its actuator is only $\frac{3}{16}$ of an inch, the resistor is angularly adjusted in such a way that for the maximum and minimum positions of the contact shoe, the contact edge 17 of the shoe makes contact with the endmost turns of the resistor winding 46. The nut 35 is then tightened, arresting the bracket 30 against further angular movement. It is quite apparent that the zero adjustment and the range adjustment are independent from each other so that a correction of the range adjustment or a correction of the zero adjustment may be made without disturbing the other.

The shorted sections at each end of the potentiometer winding permit the contact shoe to travel beyond the endmost active resistor turns without causing the potentiometer to open its circuit. If this were not done, a slight amount of over-pressure, for example, would cause the indicator needle to drop to zero, and then jump back to its maximum position as soon as the over-pressure is relieved. This would be an undesirable behavior as it would tend to make the measuring device unstable at the maximum range point. The illustrated form of resistor permits the actuator to go beyond its normal maximum position without causing the indication to deviate from its maximum position.

The invention thus provides an improved form of potentiometer assembly which is inexpensive to construct and very convenient to adjust because of the independence of zero adjustment and range adjustment from each other.

What is claimed is:

1. An adjustable potentiometer assembly for use with a contact shoe mounted for translatory movement and having a substantially linear contact edge transverse to the direction of shoe movement, the assembly comprising, a standard having a lengthwise slot therein; a slider movable relatively to said standard in the direction of said slot; a screw for arresting said slider relatively to said standard in a predetermined position of adjustment along said slot; a bracket mounted on said slider for rotative adjustment above an axis passing through said slot; a screw for arresting said bracket in a predetermined rotative position relatively to said slider; and a resistor mounted on said bracket, said resistor having a substantially linear contact edge for engagement with said shoe, the content edge of the resistor passing through said axis, whereby rotative adjustment of said resistor for decrease and increase in the potentiometer range may be made without disturbing the zero position.

2. An adjustable potentiometer assembly for use with a contact shoe mounted for translatory movement and having a substantially linear contact edge transverse to the direction of shoe movement, the assembly comprising, a standard having a lengthwise slot therein; a slider movable relatively to said standard in the direction of said slot; a first adjustment screw passing through said slider and said slot for arresting said slider relatively to said standard in a predetermined position of adjustment along said slot; a bracket; a second adjustment screw passing through said slider, said slot, and said bracket for rotatively mounting said bracket on said slider and for arresting said bracket in a predetermined rotative position relatively to said slider; and a resistor mounted on said bracket, said resistor having a substantially linear contact edge for engagement with said shoe.

3. An adjustable potentiometer assembly for use with a contact shoe mounted for translatory movement and having a substantially linear contact edge transverse to the direction of shoe movement, the assembly comprising, a standard having a lengthwise slot therein; a slider movable relatively to said standard in the direction of said slot; a first adjustment screw passing through said slider and said slot for arresting said slider relatively to said standard in a predetermined position of adjustment along said slot; a bracket; a second adjustment screw passing through said slider, said slot, and said bracket for rotatively mounting said bracket on said slider and for arresting said bracket in a predetermined rotative position relatively to said slider; a resistor having a substantially linear contact edge for engagement with said shoe; and means for fastening said resistor on said bracket with freedom of adjustment towards, and away from, said standard.

4. An adjustable potentiometer assembly for use with a contact shoe mounted for translatory movement and having a substantially linear contact edge transverse to the direction of shoe movement, the assembly comprising, a standard of flat stock having a lengthwise slot therein; a pair of plates of flat stock on either side of said standard said plates forming a slider; a first adjustment screw passing through said plates and said slot for arresting said slider relatively to said standard in a predetermined position of adjustment along said slot; an angular bracket; a second adjustment screw passing through said two plates, said slot and said bracket for arresting said bracket in a predetermined rotative position of adjustment relatively to said slider and for additionally clamping said plates together; a block of insulating material; a pair of clamp screws for fastening said block on said bracket with freedom of adjustment towards, and away from, said standard; a resistor mounted on said block, said resistor having a substantially linear contact edge for engagement with said shoe, the thickness of said block being such as to bring said contact edge into the imaginary extension of the axis of said second adjustment screw.

5. An adjustable potentiometer assembly for use with a contact shoe mounted for translatory movement and having a substantially linear contact edge transverse to the direction of shoe movement, the assembly comprising, a standard providing a track; a slider movable lengthwisely along said track; means for arresting said slider relatively to said standard in a predetermined position of adjustment along said track; a bracket rotatably mounted on said slider about an axis extending at right angles to the direction of said track; means for arresting said bracket in a predetermined rotative position relatively to said slider; a resistor mounted on said bracket, said resistor having a substantially linear contact edge for engagement with said shoe, the contact edge intersecting the imaginary plane defined by said track and said axis at said axis, whereby rotative adjustment of said resistor for decrease and increase in the potentiometer range may be made without disturbing the zero position.

CHARLES H. COLVIN.

No references cited.